(12) United States Patent
Renner

(10) Patent No.: US 8,589,809 B2
(45) Date of Patent: Nov. 19, 2013

(54) METHODS AND SYSTEMS FOR CONDUCTING A MEETING IN A VIRTUAL ENVIRONMENT

(75) Inventor: Kevyn Renner, El Dorado Hills, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 232 days.

(21) Appl. No.: 12/323,793

(22) Filed: Nov. 26, 2008

(65) Prior Publication Data

US 2009/0222744 A1    Sep. 3, 2009

Related U.S. Application Data

(60) Provisional application No. 61/032,276, filed on Feb. 28, 2008.

(51) Int. Cl.
*G06F 3/048* (2013.01)
*G06F 3/00* (2006.01)

(52) U.S. Cl.
USPC ........... 715/757; 715/744; 715/763; 715/764; 715/848; 715/850; 715/852

(58) Field of Classification Search
USPC ......... 715/744, 757, 763, 764, 848, 850, 852, 715/709; 709/204, 205, 219, 223, 227
See application file for complete search history.

(56) References Cited

U.S. PATENT DOCUMENTS

| | | | | |
|---|---|---|---|---|
| 6,002,853 A * | 12/1999 | de Hond | ........................ | 709/219 |
| 6,119,147 A * | 9/2000 | Toomey et al. | ............... | 709/204 |
| 6,161,051 A | 12/2000 | Hafemann et al. | | |
| 6,219,045 B1 * | 4/2001 | Leahy et al. | .................. | 715/757 |
| 6,362,817 B1 * | 3/2002 | Powers et al. | ................. | 345/419 |
| 6,396,522 B1 * | 5/2002 | Vu | ................ | 715/848 |
| 6,414,679 B1 * | 7/2002 | Miodonski et al. | ........... | 345/420 |
| 6,570,563 B1 * | 5/2003 | Honda | ........................... | 345/419 |
| 6,573,903 B2 * | 6/2003 | Gantt | ........................... | 345/619 |
| 6,784,901 B1 * | 8/2004 | Harvey et al. | ................. | 715/757 |
| 6,792,615 B1 | 9/2004 | Rowe et al. | | |

(Continued)

FOREIGN PATENT DOCUMENTS

| | | |
|---|---|---|
| EP | 1094657 | 4/2001 |
| JP | 2000-29944 | 1/2000 |
| KR | 10-2006-0062255 | 6/2006 |

OTHER PUBLICATIONS

Allen Bradley, PremierSystems Suite, Sep. 2007, Rockwell Automation, Milwaukee, WI.

(Continued)

*Primary Examiner* — Nicholas Augustine
(74) *Attorney, Agent, or Firm* — Merchant & Gould

(57) ABSTRACT

Systems and methods of conducting a meeting between a plurality of people in a virtual environment are provided. A display associated with each of the plurality of people outputs a virtual conference room that includes an avatar associated with each of the plurality of people, and a virtual display that displays a 3-D model of a manufacturing facility. A selection of an object of the 3-D model is received and the virtual display displays information associated with the selected object of the 3-D model. The display associated with each of the plurality of people outputs the virtual conference room and the virtual display with the information associated with the selected object of the 3-D model.

27 Claims, 8 Drawing Sheets

(56) References Cited

U.S. PATENT DOCUMENTS

| | | | |
|---|---|---|---|
| 6,961,055 B2 * | 11/2005 | Doak et al. | 345/419 |
| 7,414,629 B2 * | 8/2008 | Santodomingo et al. | 345/582 |
| 7,663,625 B2 * | 2/2010 | Chartier et al. | 345/440 |
| 7,746,343 B1 * | 6/2010 | Charaniya et al. | 345/428 |
| 7,788,323 B2 * | 8/2010 | Greenstein et al. | 709/204 |
| 7,814,429 B2 * | 10/2010 | Buffet et al. | 715/763 |
| 7,817,150 B2 * | 10/2010 | Reichard et al. | 345/419 |
| 7,844,724 B2 * | 11/2010 | Van Wie et al. | 709/231 |
| 2001/0018667 A1 * | 8/2001 | Kim | 705/14 |
| 2002/0113820 A1 * | 8/2002 | Robinson et al. | 345/764 |
| 2005/0093719 A1 * | 5/2005 | Okamoto et al. | 340/995.1 |
| 2005/0128212 A1 * | 6/2005 | Edecker et al. | 345/582 |
| 2005/0257204 A1 | 11/2005 | Bryant et al. | |
| 2006/0167997 A1 | 7/2006 | Forstadius | |
| 2006/0206367 A1 | 9/2006 | Baker | |
| 2007/0011273 A1 | 1/2007 | Greenstein et al. | |
| 2008/0049013 A1 | 2/2008 | Nasle | |

OTHER PUBLICATIONS

Genesis 32, 2007, Iconics Inc., Foxborough, MA.

Cimplicity HMI, 2004, GE Fanuc International Inc., Albany, NY.

Allen Bradley, RSVIEW Product Profile, May 2005, Rockwell Automation, Milwaukee, WI.

Robert J. Stone, Virtual Reality in the Real World: A Personal Reflection on 12 Years of Human-Centered Endeavour, Dec. 5-7, 2001, Virtual Presence Limited, UK.

Wonderware System Platform 2.1 Foundation for a Flexible Approach to Operational Excellence, Jan. 2007, Wonderware, Lake Forest, CA.

Paul Helm, Immersive Technology as a Training Method for Young Professional, Talent & Technology, Sep. 2009, Hewlett-Packard.

Remy Malan, "Virtual" Solutions Drive Collaboration, The American Oil & Gas Reporter, Jul. 2009, Qwaq Inc., Redwood City, CA.

International Search Report mailed Sep. 14, 2009 cited in Application No. PCT/US2009/035164.

Kibira, D. et al. Virtual Reality Simulation of a Mechanical System Product Line, Dec. 8, 2002, vol. 2, pp. 1130-1137, XP010623797.

Roy, U. et al., Product Design Through Virtual Collocation of Product Designers and Design Services, Aug. 20, 1997, pp. 101-108, XP001040923.

Lianguan, Shen et al., "Web Based Cooperative Virtual Product Design Environment Shared by Designers and Customers", Jan. 1, 2006, pp. 384-393, XP019029139.

International Search Report mailed Nov. 8, 2012, cited in Application No. PCT/US2009/035164.

* cited by examiner

METHODS AND SYSTEMS FOR CONDUCTING A MEETING IN A VIRTUAL ENVIRONMENT

CROSS-REFERENCE TO RELATED APPLICATIONS

The present application claims priority under 35 U.S.C. §119, to U.S. Provisional Application No. 61/032,276, filed Feb. 28, 2008, the entire disclosure of which is herein expressly incorporated by reference.

FIELD OF INVENTION

The present invention relates to a method and system for conducting a meeting in a virtual environment, in particular, for use in improved manufacturing facility and asset operation, maintenance, and training.

BACKGROUND OF THE INVENTION

Today a manufacturing business enterprise may have operations, experts, and facilities spread across the globe. Getting all the appropriate personnel in one place at one time for training, knowledge sharing, or troubleshooting is difficult, expensive, and often not timely enough to address an urgent issue. Teleconferences or even web-conferences, however, provide only limited participant interaction and do not provide a true visual reference to the plant equipment that is the subject of the discussion. Also, taking expensive manufacturing equipment off line for training and maintenance purposes is expensive and disruptive to the manufacturing process. Longer off-line times occur for repairs or maintenance when work crews do not have sufficient advance training. Furthermore, the more time spent by personnel in a live plant increases the risk of injury to such personnel.

SUMMARY OF THE INVENTION

In view of the above-identified and other deficiencies of conventional methods and systems, it has been recognized that real-time, real-asset data is needed in association with manufacturing facility assets in order to have meaningful computer-based training or management of operations. Accordingly, it would be useful to have a method and system for addressing the above-described needs and overcoming shortcomings in any existing systems.

Systems and methods of conducting a meeting between a plurality of people in a virtual environment are provided. An exemplary method involves outputting, on a display associated with each of the plurality of people, a virtual conference room that includes an avatar associated with each of the plurality of people and a virtual display that displays a 3-D model of a manufacturing facility. A selection of an object of the 3-D model is received and the virtual display displays information associated with the selected object of the 3-D model. The display associated with each of the plurality of people outputs the virtual conference room and the virtual display with the information associated with the selected object of the 3-D model.

The information associated with the object may provide a source for collaborative updating, editing and training on the execution of typical operating and maintenance work processes.

When the manufacturing facility is an oil refinery, the selected object can be one of a vessel, rotating machinery, separation equipment and vessels, mixing equipment and vessels, reaction equipment and vessels, associated values, piping, instrumentation and/or other structures.

The information associated with the selected object can be, for example, maintenance data, operational data, inspection data or a document associated with the selected object. Alternatively, or additionally, the information associated with the selected object is a plurality of sub-objects.

The method also involves receiving a selection of one of the sub-objects and displaying on the virtual display information associated with the selected sub-object of the 3-D model. The display associated with each of the plurality of people outputs the virtual conference room and the virtual display with the information associated with the selected sub-object of the 3-D model.

The information associated with the selected sub-object can be, for example, maintenance data, operational data, inspection data or a document associated with the selected object.

The method can also involve updating the 3-D model of the manufacturing facility using real-time data. The real-time data can be, for example, maintenance data, operational data, inspection data or a document.

An exemplary system includes a server that executes a computer program to produce a virtual environment that includes a virtual conference room and a plurality of user terminals, associated with each of the plurality of people coupled to the server by a network. The system can also include a manufacturing facility information storage coupled to the server. The server includes display logic to provide an output of the virtual conference room to a display associated with each of the plurality of user terminals, the virtual conference room including an avatar associated with each of the plurality of people, and a virtual display that displays a 3-D model of a manufacturing facility. The server includes selection logic that receives a selection of an object of the 3-D model, and in response to the selection the display logic provides an output to the display associated with each of the plurality of people with the virtual display with the information associated with the selected object of the 3-D model.

DETAILED DESCRIPTION OF PREFERRED EMBODIMENTS OF THE INVENTION

Figure 1A:
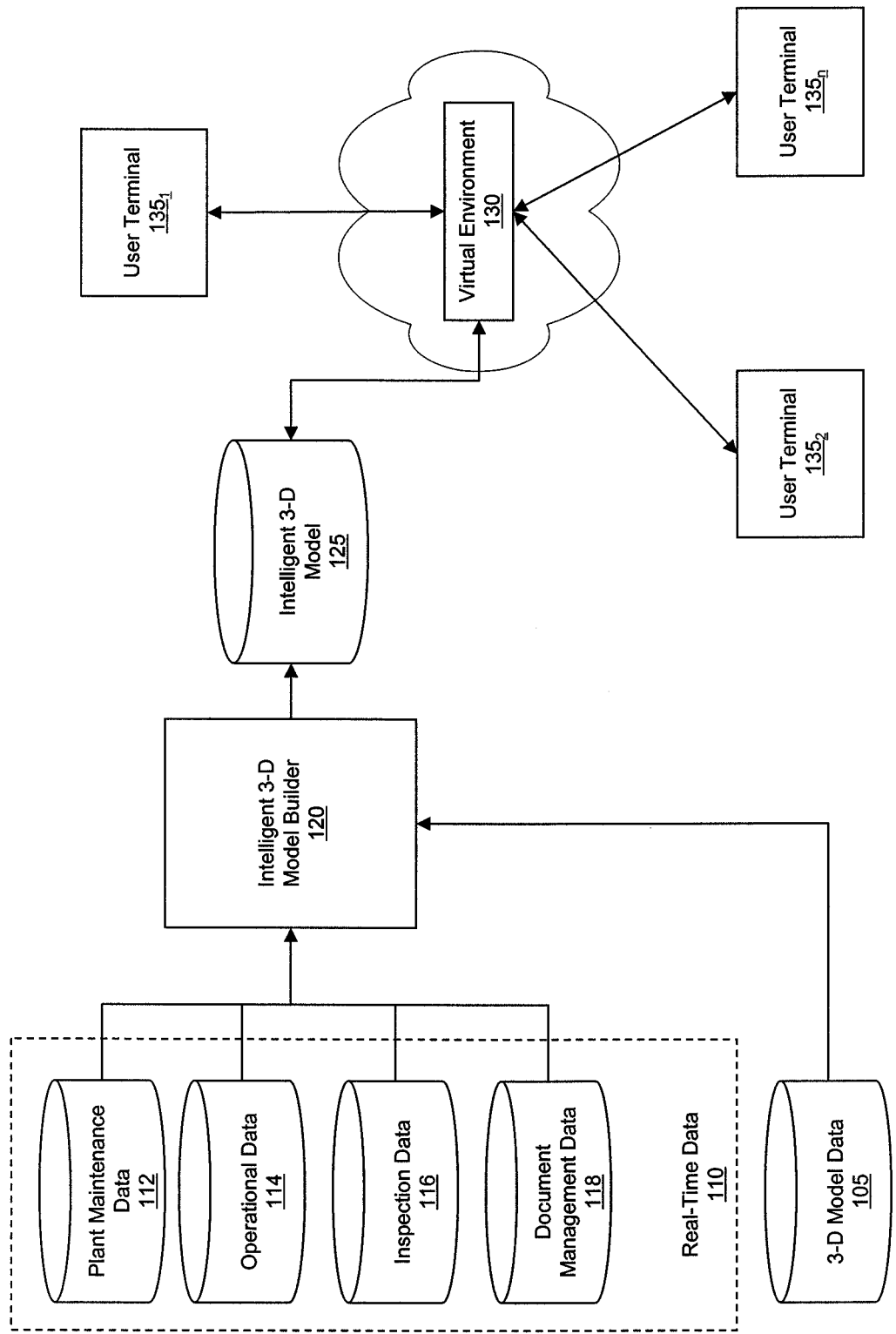
FIG. 1A is a block diagram of an exemplary system in accordance with the present invention.

FIG. 1A is a block diagram of an exemplary system in accordance with the present invention. The system includes a plurality of user terminals $135_1$-$135_n$ coupled to virtual environment 130. User terminals $135_1$-$135_n$ can be any type of user terminal, including, but not limited to, desktop computers, laptop computers, personal digital assistants (PDAs), wireless telephones, smart phones and/or the like. As will be described in more detail below in connection with FIG. 2, virtual environment 130 is executed on a server.

An intelligent, location accurate, 3-D model of a manufacturing facility 125 is also coupled to virtual environment 130. Intelligent 3-D model 125 is coupled to intelligent 3-D model builder 120, which in turn is coupled to 3-D model data database 105, and real-time data databases 110. Real-time data databases include plant maintenance data database 112, operational data database 114, inspection data database 116 and document management system data database 118. Other types of real-time data can be employed in addition to, or as an alternative to, those illustrated in FIG. 1A. One or more of the elements of FIG. 1A can be coupled to each other by way of any type of network, such as, for example, the Internet.

Figure 1B:
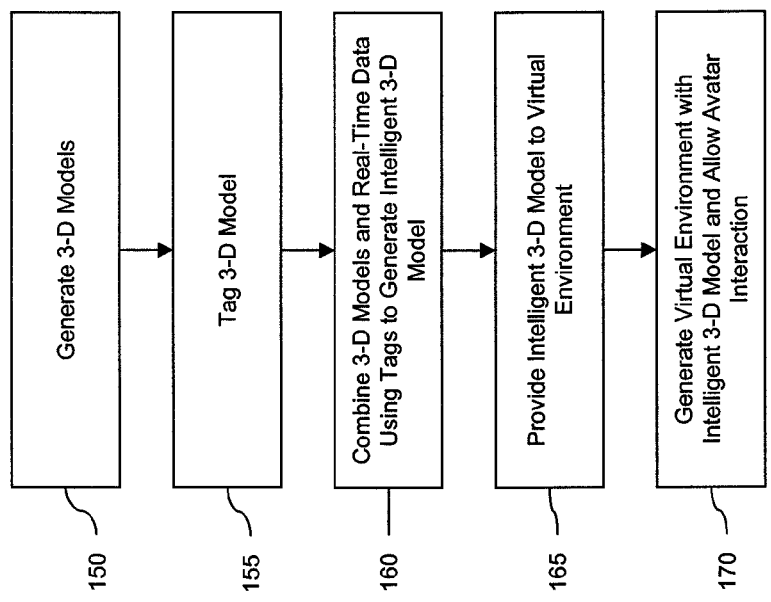
FIG. 1B is a flow diagram of an exemplary method in accordance with the present invention.

Overall operation of the system will now be described in connection with the flow diagram of FIG. 1B. Initially, one or more location accurate 3-D models of a manufacturing facility are generated and populated into database 105 (step 150). The 3-D models can be generated using, for example, laser scanning techniques, such as those provided by INOVx of Irvine Calif. Alternatively, or additionally, the object models can be created by conversion of 2-D or 3-D computer-aided design (CAD) files. The 3-D models can be designed with any desired tolerance, such as five millimeters. Thus, for example, although a piping is designed to be perfectly vertical, the 3-D model can reflect any variance in the horizontal direction.

Various elements of the 3-D models that will be updated with real-time data are tagged (step 155). These elements can be any elements, such as objects, sub-objects, components, structures, circuits, sub-system and/or the like. Intelligent 3-D model builder 120 then uses the tags to combine the 3-D model data with real-time data to generate an intelligent 3-D model (step 160). The 3-D model is "intelligent" in that it is based on both structural and operational information, and it is also updated based on real-time data. The intelligent 3-D model is stored in database 125, which provides the model to virtual environment 130 (step 165). As will be described in more detail below, the virtual environment 130 generated using the 3-D model allows interaction between the model and avatars representing users of terminals $135_1$-$135_n$ (step 170). Although not illustrated, the 3-D model itself can be updated to reflect structural changes, such as new elements, rearrangement of elements, etc.

Figure 2:
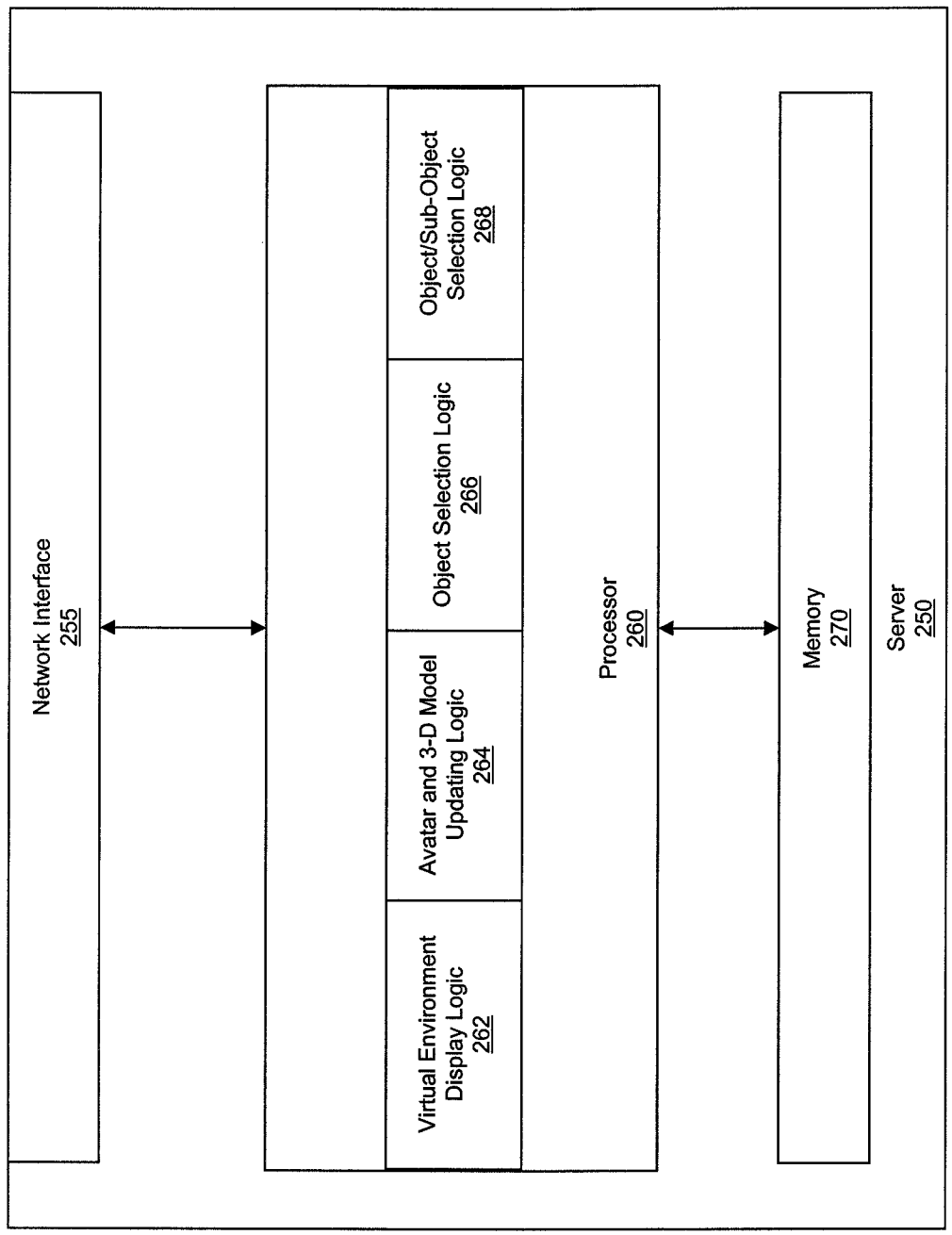
FIG. 2 is a block diagram of an exemplary server that executes a computer program to produce a virtual environment in accordance with the present invention.

Now that an overview of the generation of the virtual environment has been provided, a description of the operation of the virtual environment will be described in connection with FIGS. 2-4. FIG. 2 is a block diagram of an exemplary server that executes a computer program to produce a virtual environment in accordance with the present invention. The server 250 includes a network interface 255 to exchange information with user terminals $135_1$-$135_n$ and with intelligent 3-D model database 125. Network interface 255 is coupled to processor 260, which in turn is coupled to memory 270. Processor 260 includes logic 262-268, which will be described in more detail below. Processor 260 can be any type of processor including a microprocessor, field programmable gate array (FPGA), application specific integrated circuit (ASIC) and/or the like. When the processor is a microprocessor, logic 262-268 can be processor-executable code loaded from memory 270.

Figure 3A:
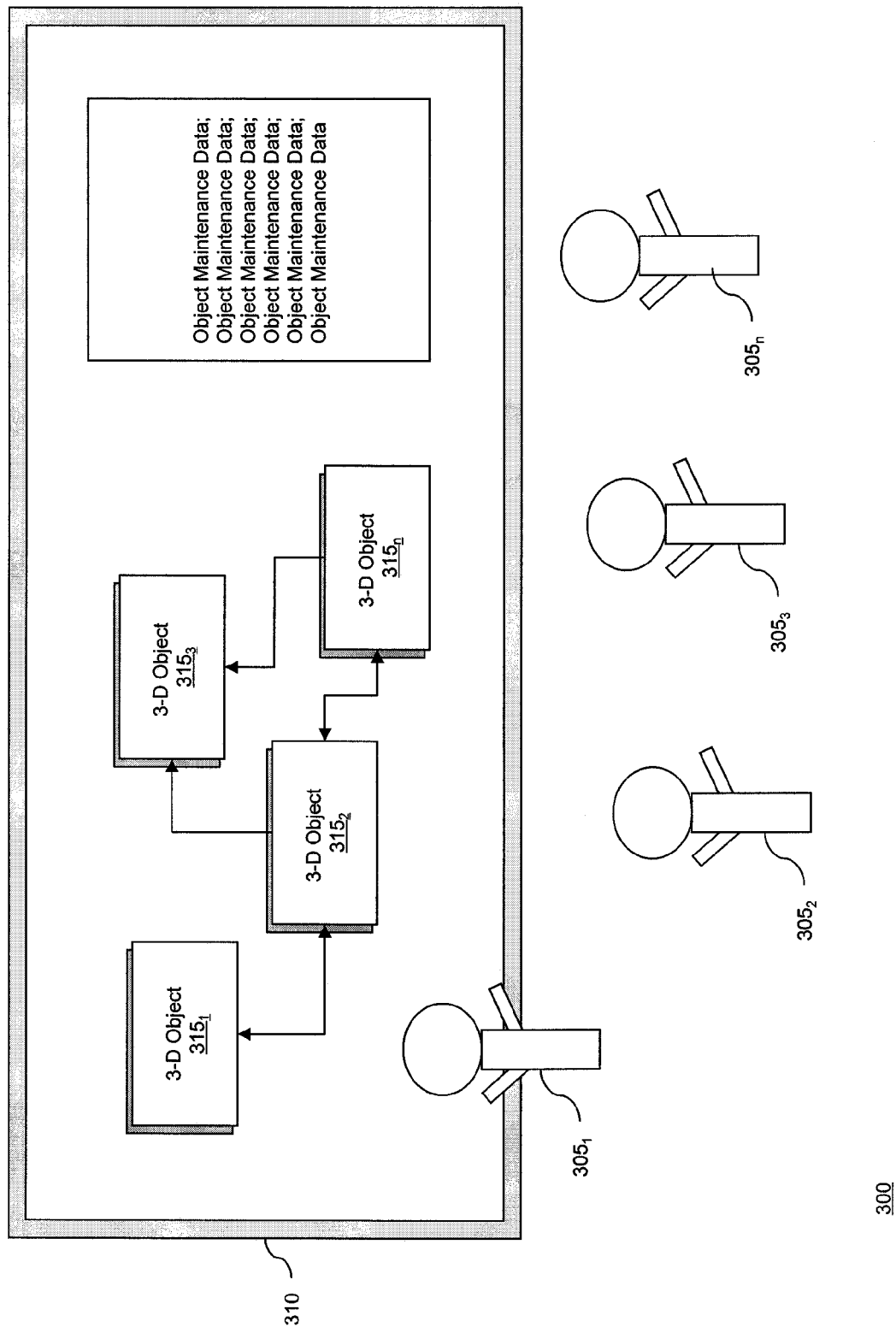
FIGS. 3A-3D is a block diagram illustrating an exemplary virtual conference room in accordance with the present invention.
Figure 4:
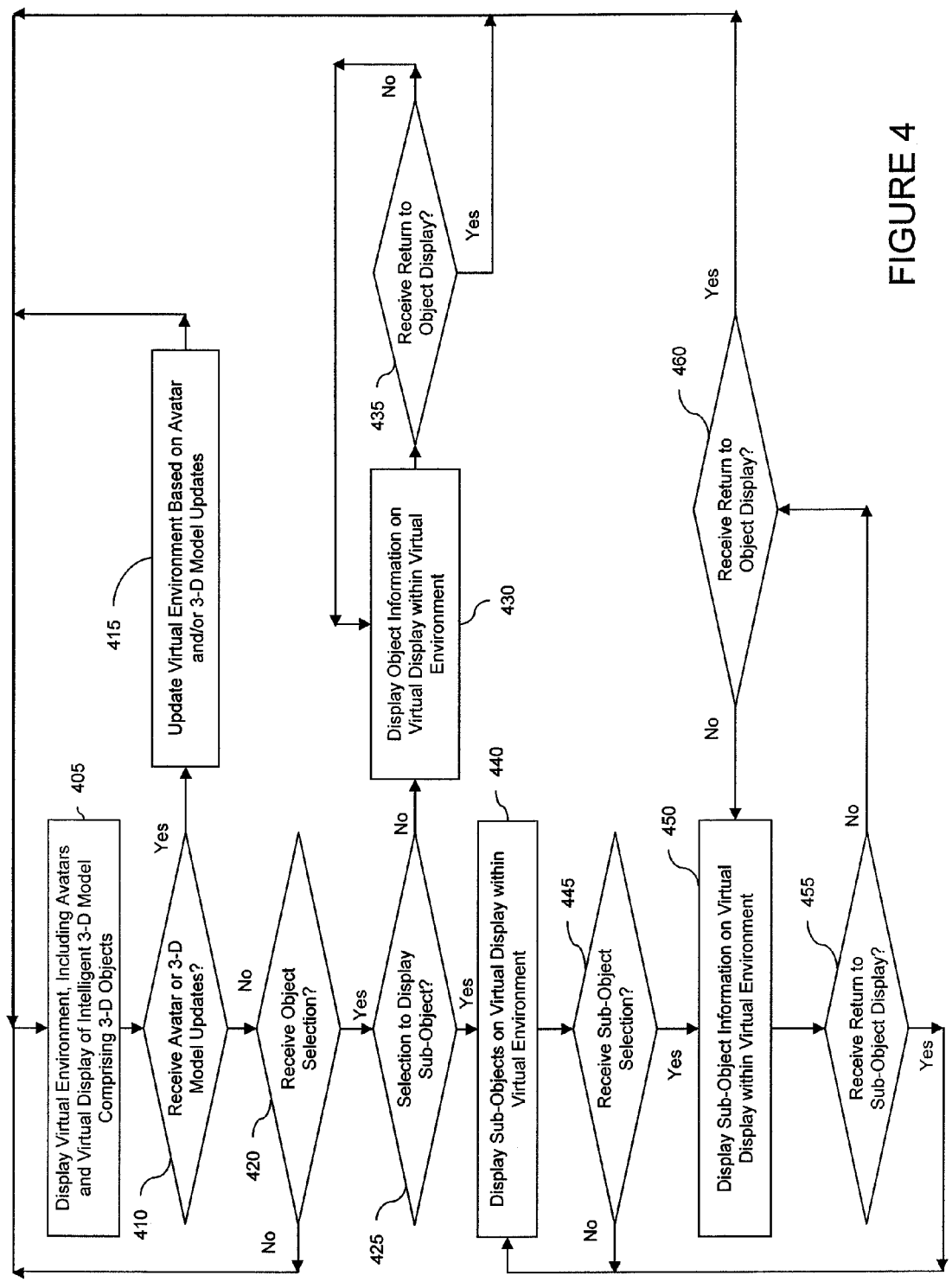
FIG. 4 is a flow diagram of another exemplary method in accordance with the present invention.

Turning now to FIGS. 3A and 4, logic 262 initially displays a virtual environment that includes avatars $305_1$-$305_n$, and virtual display 310 that includes an intelligent 3-D model comprising 3-D objects $315_1$-$315_n$ (step 405). Depending upon the type of manufacturing facility represented by the intelligent 3-D model, the objects can be, for example, one of a vessel, rotating machinery, separation equipment and vessels, mixing equipment and vessels, reaction equipment and vessels, associated valves, piping, instrumentation elements and/or other structures. The virtual display can also display additional information, such as, for example, object maintenance data.

Although FIG. 3A illustrates a particular number of avatars and a particular number of objects comprising the 3-D model, the present invention can be employed with greater or fewer numbers of avatars and/or objects comprising the 3-D model. Furthermore, the arrangement of the objects of the 3-D model is merely exemplary and the objects can be arranged in a different manner. Additionally, the present invention can also be employed with more than one display. Although not illustrated, the virtual environment can include more than one virtual conference room and/or virtual display. Furthermore, the virtual conference room can include a virtual whiteboard, as well as elements for capturing avatar notes and comments, such as flip charts, attached text or audio comments and/or the like.

Logic 264 then determines whether server 250 has received an avatar or 3-D model updates (step 410). Avatar updates can include the addition or removal of avatars due to user terminals or sessions joining or leaving the virtual environment and/or movement of avatars within the virtual environment. 3-D model updates can include updates based on real-time data 110. When logic 264 determines that such updates have been received ("Yes" path out of decision step 410), then logic 264 updates the virtual environment (step 415), and logic 262 displays the virtual environment with the updated information (step 405).

When avatar or 3-D model updates have not been received ("No" path out of decision step 410), then logic 266 determines whether a 3-D object selection has been received (step 420). A 3-D object selection can be performed using an input device at one of the user terminals $135_1$-$135_n$, movement of an avatar within the virtual environment to select the object and/or the like. The input device can be any type of input device including, but not limited to, a keyboard, keypad, mouse, pen input device, trackpad, trackball and/or the like. When an object selection has not been received ("No" path out of decision step 420), then logic 262 continues to display the virtual environment (step 405).

Figure 3B:
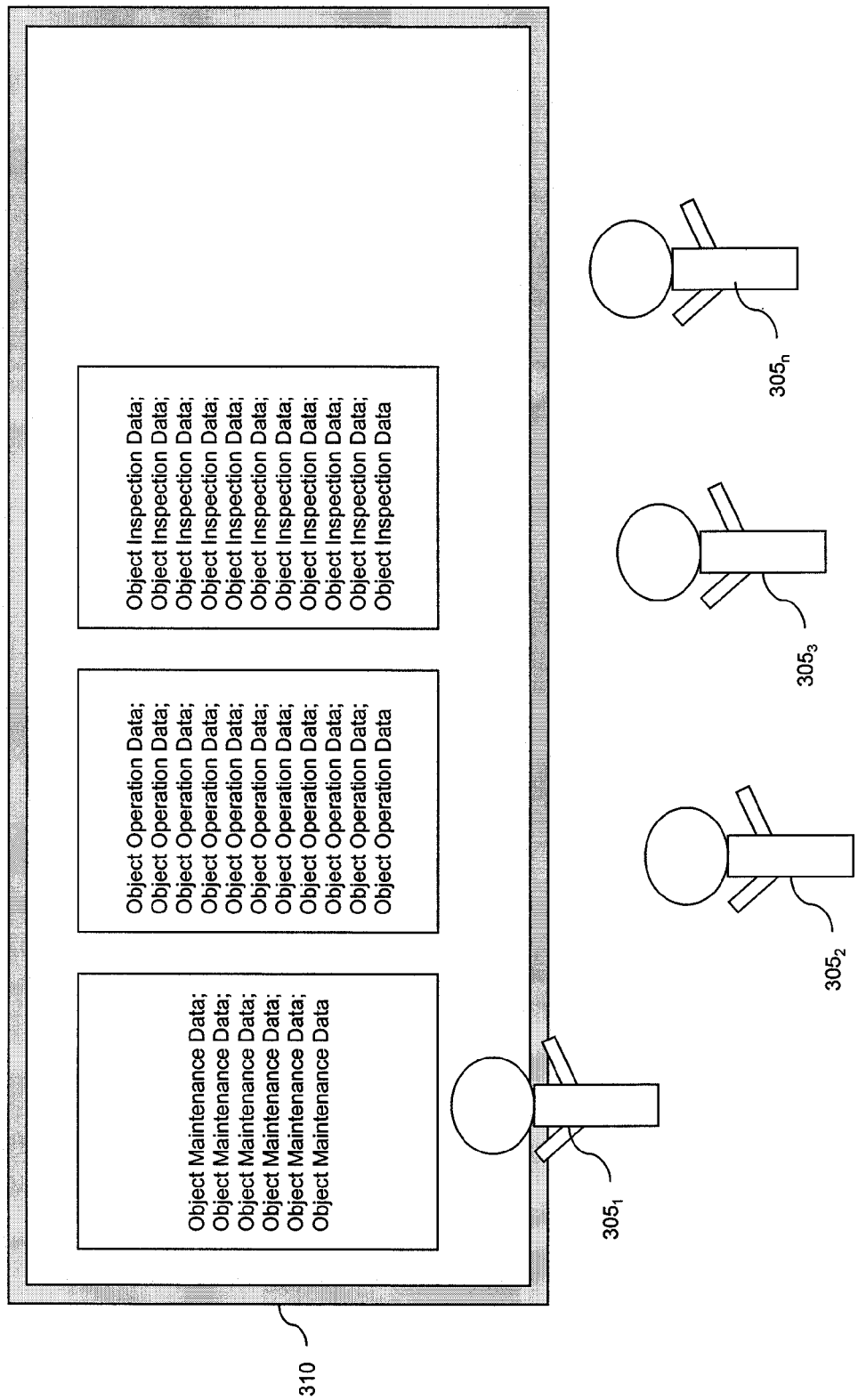

When, however, an object selection is received ("Yes" path out of decision step 420), then logic 268 determines whether the selection is to display information about the selected object or to display sub-objects of the selected object (step 425). The information can be, for example, maintenance data, operational data, inspection data or a document associated with the selected object. When logic 268 determines that the selection is to display information about the selected object ("No" path out of decision step 425), then, as illustrated in FIG. 3B, logic 262 displays the object information on display 210 (step 430). Users can interact with the data using an input device of the user terminal and/or avatars until one of the user's requests that display 210 be returned to the state where it displays the 3-D model comprising the 3-D objects ("Yes" path out of decision step 435).

Figure 3C:
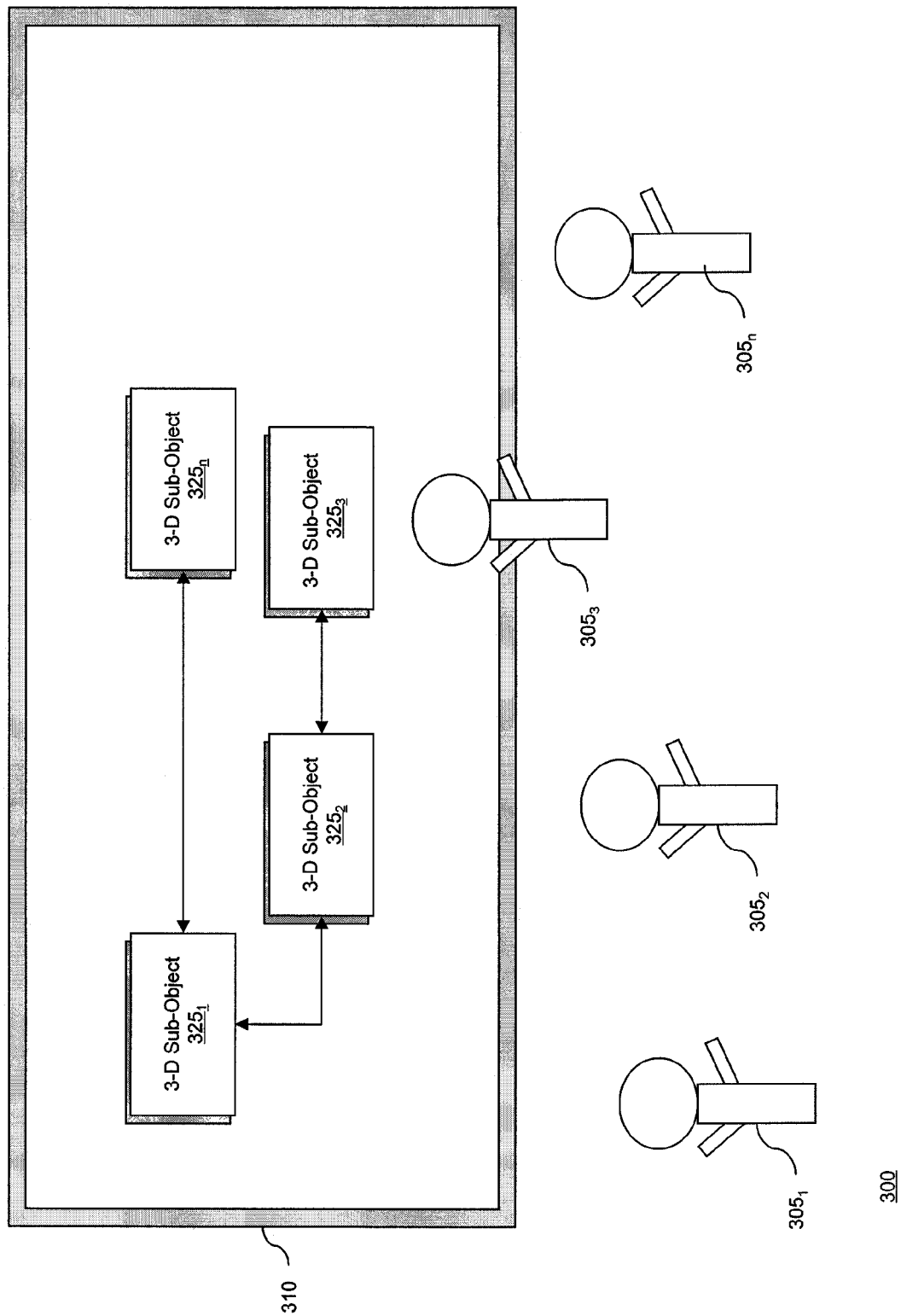
Figure 3D:
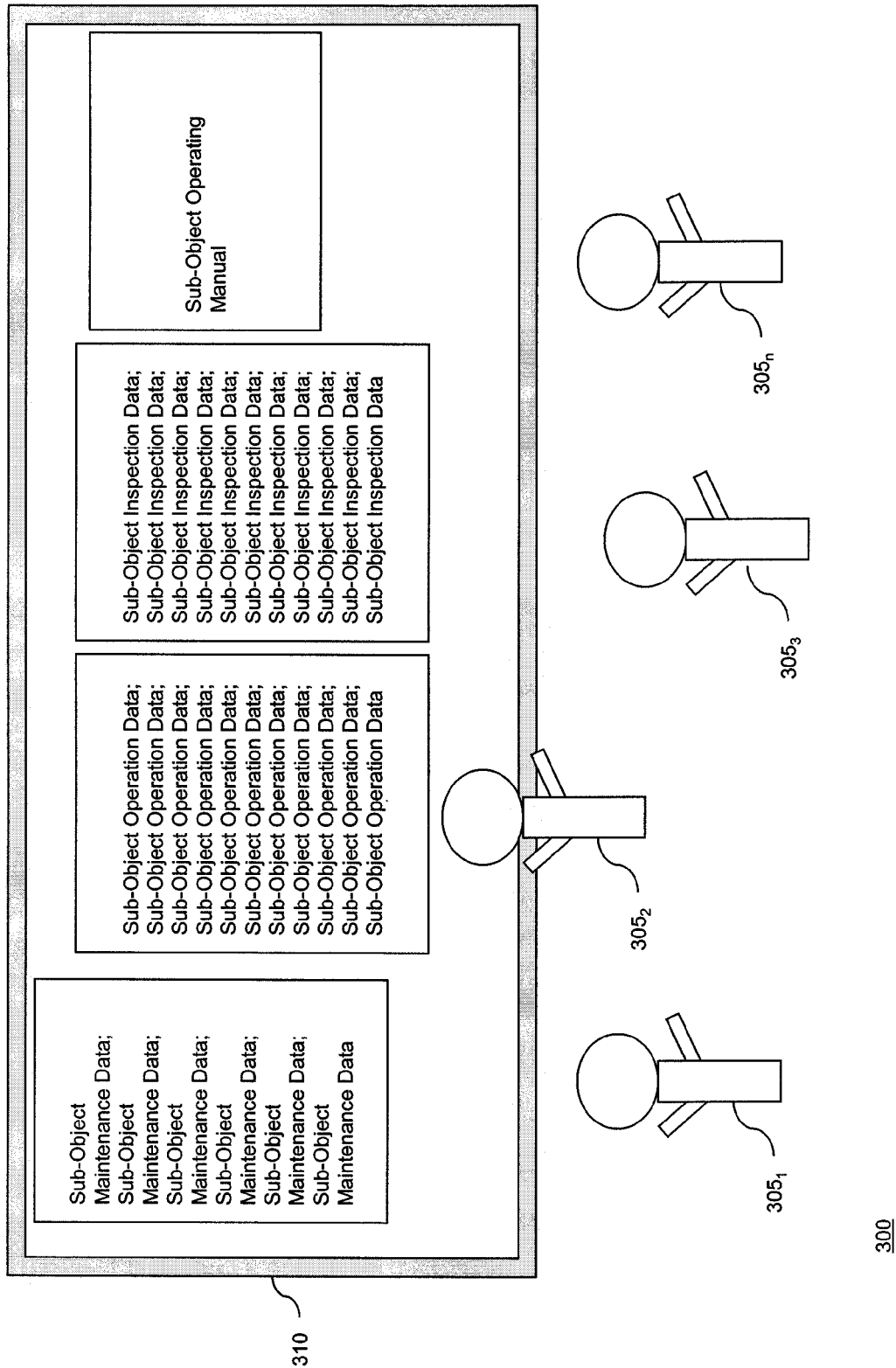

When the object selection is to display the sub-objects of the selected object ("Yes" path out of decision step 425), then, as illustrated in FIG. 3C, logic 262 displays the 3-D sub-objects $325_1$-$325_n$ (step 440). When a sub-object selection is received ("Yes" path out of decision step 445), then, as illustrated in FIG. 3D, logic 262 displays the sub-object information within the virtual environment (step 450) until logic 262 receives a request from one of the users and/or avatars to return to the sub-object display ("Yes" path out of decision step 455) or to return to the object display ("Yes" path out of decision step 460).

Although the Figures above illustrate particular information being included on the displays, the present invention is not so limited. For example, the displays can provide "knowledge views" that combine various views for added perspective. For example, structural steel and piping views can be combined so that proper access and routing can be planned and communicated to turnaround staff. Scaffolding plans can be laid over the views to ensure suitability. Similarly, the present invention provides the ability to subtract views to provide a better understanding of a particular environment. The views, including the knowledge views, can be panned, zoomed and otherwise navigated to gain a full perspective.

The present invention can also provide a querying capability. Thus, for example, a query for all pipes containing sour gas and having a corrosion rate greater than 4 mils/annum and an operating temperature greater than 500 degrees can be performed to produce an intelligent 3-D model of such pipes. This would involve pulling data from the various databases to identify such pipes.

In addition, the present invention can provide a simulation and playback capability to create move-like depictions of scenarios and events, which would support training, learning and reviews of upsets and recovery processes. This capability can also include the ability to add annotations that persist in the context for developing procedures and advancing best practices among the viewers of the depictions.

The present invention can be used in a variety of contexts. For example, if an upgrade project is planned for motor operated valves, power lines, power poles and junction boxes feeding the valves can easily be located and identified. The present invention can also be employed for determining optimal lineups, sequencing of actions, back flushing volumes, etc. Similarly, the intelligent 3-D models allow inspects to determine scaffolding needs, access limitations and safety requirements prior to visiting the actual physical plant. The databases can also include information about dynamic assets, such as cranes, that may be temporarily deployed at a plant.

An exemplary use of the present invention can be for repairs. Accordingly, the intelligent 3-D model can be coupled with a temporary repair database in order to determine all opportunities for permanent repair within the boundaries of any turnaround activity or work order involving a shut down. This can involve the querying capability discussed above. Furthermore, work orders can be precisely linked to the target equipment or systems to provide the most current asset. The present invention also allows for the work orders to be linked with the necessary scheduled support, such as fork lifts, scaffolding, etc.

As described above, the present invention is used for conducting a meeting in a virtual environment using intelligent 3-D models of a manufacturing facility. This is particularly advantageous for use to improve manufacturing facility and asset operation, maintenance, and training. For example, instead of requiring a number of persons to travel to a single manufacturing facility to evaluate the operation and/or maintenance issues with the facility, these issues can be addressed with one or more of the people being located at remote locations. Further, instead of requiring people to travel to a particular facility to train on the operation of one or more components (e.g., machines) of the facility, these people can be remotely trained using the present invention. The use of real-time data in the intelligent 3-D model leads to a reduction in travel costs, allows full participation by all persons, and does not require taking expensive manufacturing equipment off line for training and maintenance purposes, which is expensive and disruptive to the manufacturing process. Furthermore, the virtual environment produces significant safety advantages by reducing the time personnel spend within a live plant environment.

The use of intelligent 3-D models provides significant advantages over conventional 2-D drawings. Whereas 2-D drawings (e.g., isometric drawings) are prone is misunderstanding, the 3-D models of the present invention allow for easy comprehension of the modeled element. Furthermore, 2-D drawings typically reflect only the design of the system, whereas the intelligent 3-D models of the present invention not only represent what was actually built, but also any later improvements or other developments. Additionally, typical 3-D models are static and are not updated as modifications are made to process equipment, whereas the intelligent 3-D models of the present invention account for modifications.

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A method of conducting a meeting between a plurality of people, the method comprising:
   providing a virtual conference room comprising:
     an avatar associated with each of the plurality of people attending the meeting, and
     a virtual display of a 3-D model of a manufacturing facility;
   receiving a query from one of the plurality of people attending the meeting directed to a characteristic of one or more objects depicted in the 3-D model;
   displaying one or more virtual objects included within the 3-D model on the virtual display, the one or more virtual objects responsive to the query;
   receiving a selection from a person of the plurality of people of one of the one or more virtual objects of the 3-D model, wherein receiving the selection of the object of the 3-D model comprising receiving a selection at a point within the 3-D model;
   providing information associated with the selected object of the 3-D model to each of the plurality of people attending the meeting, wherein providing the information comprises retrieving data from one or more databases containing physical structural and operational characteristics of a real world object represented by the virtual object; and
   displaying a knowledge view to each of the people attending the meeting, the knowledge view including navigational controls for added perspective of the virtual display, wherein the knowledge view displays physical interrelationships of objects associated with two or more model subsystems, each of the two or more model subsystems including one or more objects of a common type.

2. The method of claim 1, wherein providing the virtual conference room comprising the 3-D model of the manufacturing facility comprises providing a virtual representation of an oil refinery.

3. The method of claim 2, wherein receiving the selection of the virtual object comprises receiving a selection representing one of the following real world objects: a vessel, rotating machinery, separation equipment and vessels, mixing equipment and vessels, reaction equipment and vessels, associated valves, piping instrumentation elements and other structures.

4. The method of claim 1, wherein retrieving the information associated with the selected virtual object comprises retrieving at least one of the following: maintenance data, operational data, inspection data, and a document associated with the real world object.

5. The method of claim 1, further comprising providing additional information associated with a sub-object of the selected virtual object, wherein the additional information associated with the sub-object comprises at least one of the following: maintenance data, operational data, inspection data, and a document associated with the real world object.

6. The method of claim 1, wherein providing the virtual conference room comprises providing a virtual white board.

7. The method of claim 1, comprising: updating the 3-D model of the manufacturing facility using real-time data.

8. The method of claim 7, wherein using the real-time data comprises using at least one of the following: maintenance data, operational data, inspection data, and a document.

9. A system for conducting a meeting between a plurality of people, the system comprising:
a server that executes a computer program to produce a virtual environment that includes a virtual conference room;
a plurality of user terminals, associated with each of the plurality of people, coupled to the server by a network; and
manufacturing facility information storage coupled to the server, the manufacturing facility information storage comprising physical and operational characteristics of a plurality of real world objects represented by a plurality of virtual objects,
wherein the server includes display logic to provide an output of the virtual conference room to a display associated with each of the plurality of user terminals, the virtual conference room comprising:
an avatar associated with each of the plurality of people, and
a virtual display that displays a 3-D model of a manufacturing facility;
wherein the server is configured to receive a query from one of the plurality of people attending the meeting directed to a characteristic of one or more real world objects depicted as the virtual objects in the 3-D model, and, in response, display a subset of the virtual objects on the virtual display, the subset of virtual objects responsive to the query;
wherein the server includes selection logic that receives a selection of one of the plurality of virtual objects within the 3-D model, the selection being simulated in the 3-D model, and in response to the selection the display logic provides an output to the display associated with each of the plurality of people with the virtual display with information from the manufacturing facility information storage associated with the selected virtual object of the 3-D model,
wherein the information associated with the selected virtual object comprises a plurality of sub-objects and wherein when the selection logic receives a selection of one of the sub-objects, the display logic provides an output to the display associated with each of the plurality of people of the virtual conference room and the virtual display with additional information associated with the selected sub-object of the 3-D model; and
wherein the virtual display includes a knowledge view including navigational controls for added perspective of the virtual display, wherein the knowledge view displays physical interrelationships of objects associated with two or more model subsystems, each of the two or more model subsystems including one or more objects of a common type.

10. The system of claim 9, wherein the manufacturing facility is an oil refinery.

11. The system of claim 10, wherein the selected virtual object represents one of the following: a vessel, rotating machinery, separation equipment and vessels, mixing equipment and vessels, reaction equipment and vessels, associated valves, piping instrumentation elements and other structures.

12. The system of claim 9, wherein information associated with the physical and operational characteristics of the real world objects comprises at least one of the following: maintenance data, operational data, inspection data, and a document associated with the selected virtual object.

13. The system of claim 9, wherein the information associated with the selected sub-object comprises at least one of the following: maintenance data, operational data, inspection data, and a document associated with the selected virtual object.

14. The system of claim 9, wherein the virtual conference room comprises a virtual white board.

15. The system of claim 9, wherein the server comprises a network interface to transmit the information that is output on the display associated with each of the plurality of people over a network.

16. The system of claim 15, wherein the network is the Internet.

17. The system of claim 9, wherein the server comprises updating logic that updates the 3-D model of the manufacturing facility using real-time data.

18. The system of claim 17, wherein the real-time data comprises at least one of the following: maintenance data, operational data, inspection data, and a document.

19. The method of claim 1, wherein the additional information associated with the selected sub-object comprises operational data associated with the selected object.

20. The method of claim 1, wherein the additional information associated with the selected sub-object comprises inspection data associated with the selected object.

21. The method of claim 1, wherein the additional information associated with the selected sub-object comprises a document associated with the selected virtual object.

22. The method of claim 1, wherein providing the information comprises providing a plurality of sub-objects within the 3-D model.

23. The method of claim 22, further comprising:
receiving a selection of one of the plurality of sub-objects; and
providing additional information associated with the selected sub-object of the 3-D model.

24. The system of claim 9, wherein the simulated selection comprises movement of the avatar within the 3-D model.

25. The system of claim 9, wherein the display logic further provides one or more knowledge views output to the display, the one or more knowledge views combining two or more views of the 3-D model to give the 3-D model added perspective.

26. The method of claim 1, further comprising:
querying the plurality of databases;
displaying only a plurality of virtual objects within the 3-D model satisfying the query, the selected virtual object being within the plurality of virtual objects.

27. The method of claim 1, further comprising displaying a knowledge view that combines two or more views of the 3-D model to give the 3-D model added perspective.

* * * * *